(12) United States Patent
Borgstrand

(10) Patent No.: US 6,505,041 B1
(45) Date of Patent: Jan. 7, 2003

(54) METHOD AND AN ARRANGEMENT IN A RADIO SYSTEM

(75) Inventor: Ronny Borgstrand, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/412,634

(22) Filed: Oct. 5, 1999

(30) Foreign Application Priority Data

Oct. 6, 1998 (SE) .............................................. 9803396

(51) Int. Cl.$^7$ ................................................. H04Q 7/20
(52) U.S. Cl. .................... 455/423; 455/67.1; 455/67.4; 455/561; 455/424
(58) Field of Search ............................. 455/67.4, 67.1, 455/423, 561, 424

(56) References Cited

U.S. PATENT DOCUMENTS

| | | | |
|---|---|---|---|
| 5,507,010 A | | 4/1996 | Ahonen |
| 5,521,904 A | * | 5/1996 | Eriksson et al. ............ 370/249 |
| 5,557,603 A | * | 9/1996 | Barlett et al. ............... 370/228 |
| 5,754,104 A | | 5/1998 | Saito |
| 6,075,997 A | * | 2/2000 | Lindqvist ..................... 455/561 |
| 6,049,315 A | * | 4/2000 | Meyer ......................... 343/895 |
| 6,219,359 B1 | * | 4/2001 | Basu ........................... 455/422 |
| 6,253,067 B1 | * | 6/2001 | Tsuji ........................... 455/115 |

FOREIGN PATENT DOCUMENTS

| | | |
|---|---|---|
| JP | 5-136747 A | 6/1993 |
| JP | 07273518 A | 10/1995 |
| JP | 09289482 A | 11/1997 |
| JP | 10075207 A | 3/1998 |
| JP | 10107744 A | 4/1998 |
| WO | 97/00586 | 1/1997 |

* cited by examiner

*Primary Examiner*—Lee Nguyen
*Assistant Examiner*—Danh C Le

(57) ABSTRACT

The invention relates to a method and an arrangement for testing receiver antennas in radio base stations. A low-power RF signal is emitted, having a frequency corresponding to the carrier frequency of the receiver. This signal is coupled to a transmitter antenna to be transmitted to a receiver antenna of the same system. The signal thus received is analysed by the receiver in order to determine the integrity of the receiver antenna.

12 Claims, 3 Drawing Sheets

METHOD AND AN ARRANGEMENT IN A RADIO SYSTEM

This application claims priority under 35 U.S.C. §§119 and/or 365 to 9863396-2 filed in Sweden on Oct. 6, 1998; the entire content of which is hereby incorporated by reference.

TECHNICAL FIELD OF THE INVENTION

The invention relates to a method and an arrangement for monitoring the condition of base station antennas in cellular radio systems. Such systems provide voice and data communication services. Several standards such as TACS, AMPS, D-AMPS, NMT and GSM have been established.

DESCRIPTION OF RELATED ART

One problem encountered in such systems is to determine the integrity of radio base stations used in the systems when they have been installed. Different parts of the base station equipment may be damaged from vandalism or natural causes such as, for instance, moisture. The operator of the system must detect any occurring error promptly in order to achieve sufficient coverage and service level.

One way of determining the functionality of a radio base station is to perform a manual inspection. Service personnel then inspect the base station visually and perform on-site tests. Cellular systems, however, normally require large numbers of base stations in order to achieve sufficient coverage, and therefore manual inspection becomes very cumbersome and expensive.

A more feasible method to determine the integrity of a base station is to let the base station perform various self-tests and report any incorrect behaviour to the mobile network which the base station is part of. This may be performed regularly or when traffic is low. Means for performing such self-tests may be easily integrated into most circuitry and software and are therefore widely used today.

When it comes to antennas of base stations, however, particular solutions have to be considered in order to achieve self-test functionality. It is nevertheless vital to monitor the states of the antennas since they normally extend from the base station structures and therefore are more exposed to the environment.

One method for monitoring the condition of an antenna is to perform a voltage standing wave ratio (VSWR) measurement. This method involves feeding a radio frequency signal towards an antenna. The incidental and reflected powers are measured and compared. If the incidental power is much larger than the reflected power the antenna is likely to be functioning properly.

This method is suitable for transmitter antennas and for most duplex antennas used for both transmitting and receiving. In these cases the transmitter emits a test signal and the incidental and reflected powers are measured. These measurements may be performed with a directional coupler and power meter.

When it comes to receiver antennas, however, the task is more complicated. No transmitter circuitry is present and therefore a high frequency transmitter capable of emitting at least around 1 mW must be introduced. This adds not only cost but also complexity, especially if multiple receiver antennas are used to provide antenna diversity. Moreover, if the receiver is provided with a tower-mounted amplifier (TMA), which is used to improve the receiver range, yet a further complicating element has to be considered. The reverse attenuation of the TMA is very high and therefore VSWR measurements become very difficult.

Some attempts have nevertheless been made to develop arrangements for monitoring receiver antennas in base station systems where tower mounted amplifiers are used. These systems still perform VSWR measurements. One such arrangement is disclosed in U.S. Pat. No. 5,507,010. A signal, having a frequency outside the frequency band of the receiver is then emitted from a test unit in the base station and sent towards the receiver antenna. At the site of the tower mounted amplifier this signal is picked up by a filter. The frequency of the signal is then shifted into the frequency band of the receiver and the signal is coupled directly to the receiver antenna. Such an arrangement allows a VSWR measurement to be made from the base station at the cost of introducing additional filters and frequency changing means in the system. Another possibility is to place a separate VSWR measurement unit on top of the tower mounted amplifier, which also requires a substantial number of additional components to be used, including a powerful transmission circuit.

Another disadvantage with the VSWR approach is that the receiver and transmitter antennas of the system have to be tested separately, one at a time.

There are, however, methods described in the art for simultaneously testing two antennas in a mobile radio system. One such method and a corresponding apparatus are described in WO 97/00586. A test signal is then emitted from a transmitter unit and coupled via a transmission branch of a first duplex filter to a first antenna. The signal is picked up by a second antenna and is coupled via a transmission branch of a second duplex filter, coupling means and frequency shifting means to a receiver part of the system. Such systems function properly, however, only for testing duplex antennas, and require additional frequency shifting means.

It is to be noted that VSWR measurements on duplex antennas also may be difficult. This is particularly relevant when it comes to so called dual duplex tower mounted amplifiers. In such cases up to three resonant filters are connected between the transmitter unit and the antenna. The reverse attenuation of each filter may be around 20 dB. When three filters are series connected the total attenuation make measurements difficult.

SUMMARY OF THE INVENTION

One object of the present invention is to provide a simple but efficient arrangement for testing receiver antennas in radio base stations.

Another object of the invention is to provide a simple but efficient arrangement for testing receiver antennas in radio base stations, provided with multiple receiver antennas.

Another object of the invention is to provide a simple and inexpensive arrangement for testing receiver antennas provided with tower mounted amplifiers.

Yet another object of the invention is to provide an arrangement that allows simultaneous tests of at least one receiver antenna and at least one transmitter antenna.

Yet another object of the invention is to provide an arrangement that facilitates monitoring of duplex antennas provided with dual duplex tower mounted amplifiers.

These objects are achieved, according to one aspect of the invention in a radio base station where a receiver unit is connected to a first antenna and a transmitter unit to a second antenna. The receiver receives signals within a first frequency band and the transmitter transmits signals within a second frequency band. A radio frequency test signal having a frequency within the frequency band of the receiver is coupled to the antenna of the transmitter and thereby also to the antenna of the receiver unit. An evaluation unit connected to the receiver unit evaluates the signal received in order to determine the integrity of the receiver antenna. Since the frequency of the signal received lies within the frequency band of the receiver it may be evaluated with precision even if the signal originally emitted has a power much lower than, for instance, a signal used for VSWR measurements.

According to one embodiment of the invention the test signal emitter emits a signal within a spare channel, not regularly used by the receiver. As a result the testing procedure may be performed regularly without disturbing the ongoing traffic.

According to another embodiment of the invention the antenna connected to the transmitter is a duplex antenna also used to receive signals. This antenna is connected to a duplex filter and the above mentioned test signal is coupled to the antenna at a point between the duplex filter and the antenna. This allows testing to be performed on receiver antennas when the antenna coupled to the transmitter is a duplex antenna.

According to yet another embodiment of the invention, a coupling means used to couple the test signal to the transmitter antenna may also be used to perform voltage standing wave ratio measurements on the transmitter antenna. This arrangement allows the invention to be implemented at a low cost in installations where such VSWR measurements are performed.

According to yet another embodiment of the invention, the test signal emitter may also be used to implement separate tests of multicouplers and receivers in a receiving branch of the base station. This arrangement allows the invention to be implemented at a low cost in installations where such measurements are performed.

An arrangement according to the invention is then characterised as it appears from the characterising portion of claim 1.

A method according to the invention is then characterised, as it appears from the characterising portion of claim 10.

DETAILED DESCRIPTION OF EMBODIMENTS

Figure 1:
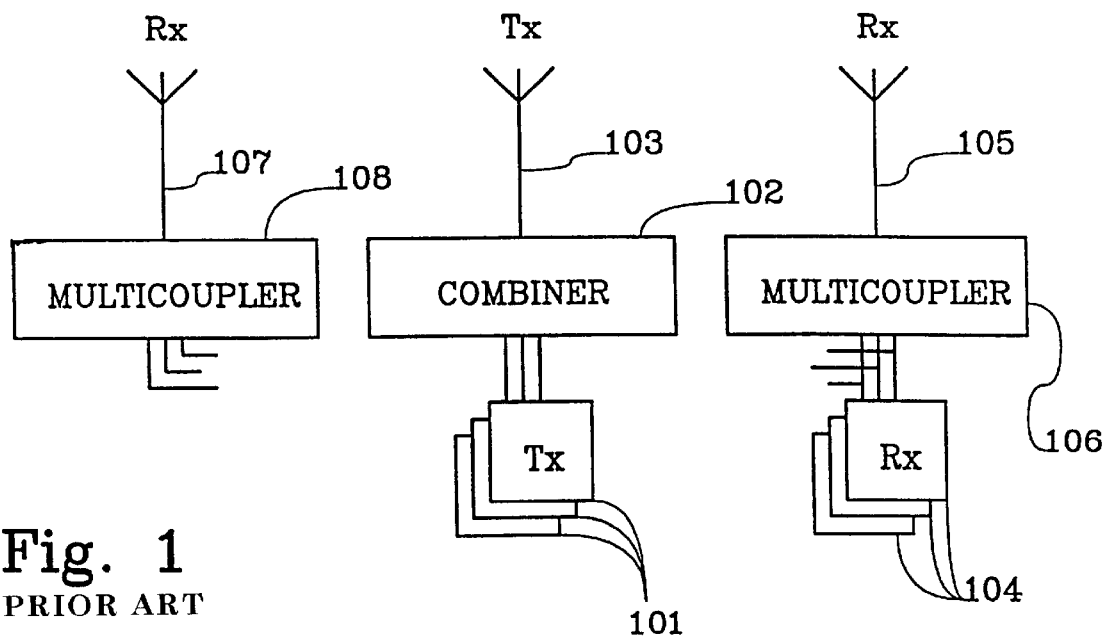
FIG. 1 illustrates, schematically, a radio base station according to prior art.

FIG. 1 illustrates, schematically, a radio base station transceiver according to prior art. The base station transceiver involves a plurality of transmitter units 101. The transmitter units are connected to a combiner 102 which provides separation between the different transmitter units 101 and directs radio frequency signals produced by the transmitter units towards a transmitter antenna 103. The combiner 102 consists of a number of resonant filters.

The base station transceiver furthermore involves a number of receiver units 104. The receiver units are connected to at least one receiver antenna 105 via a multicoupler 106, which amplify incoming signals and couples these signals to different receiver units. The receiver units may be coupled to an auxiliary antenna 107 via an auxiliary multicoupler 108 to provide antenna diversity. More than one auxiliary antenna may be used. It is to be noted that a transmitter unit and a receiver unit may be applied as different portions of a printed circuit board thus forming a transceiver unit.

Figure 2:
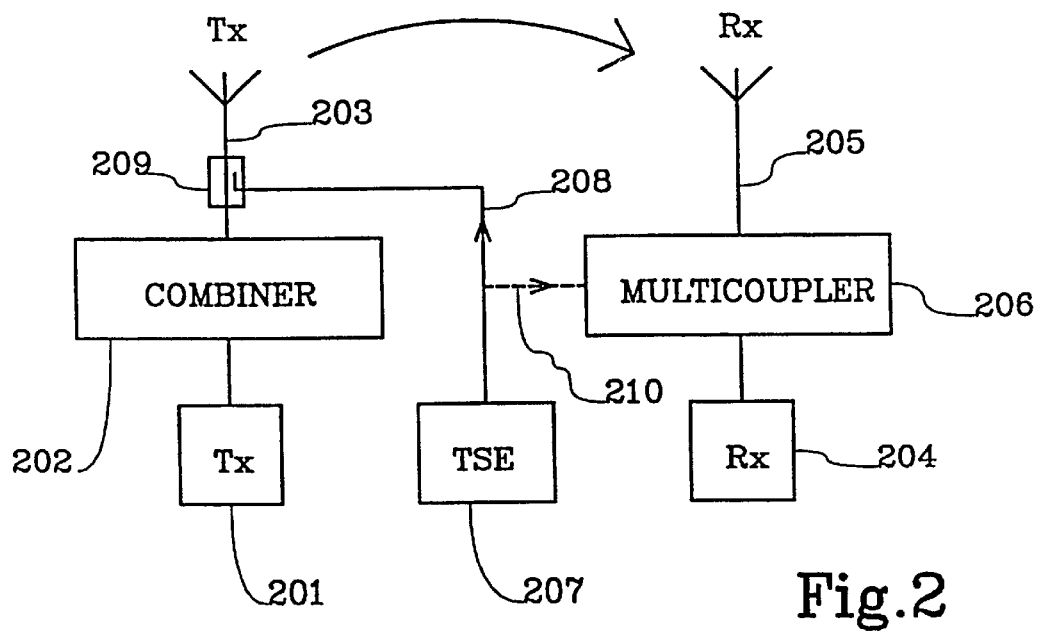
FIG. 2 describes an arrangement according to the invention, in a radio base station.

FIG. 2 describes an arrangement according to the invention, in a radio base station. It is common practice in the field of radio communication to use multiple auxiliary receiver antennas to provide antenna diversity. However, for clarity only one receiver antenna 205 is shown. The base station according to the invention comprises transmitter units 201, a combiner 202, and a transmitter antenna 203 together with the receiver antenna 205, a multicoupler 206 and receiver units 204 as described above. For clarity only one transmitter unit and one receiver unit are shown in this and the following figures.

According to the invention a test signal emitter 207 is provided to the base station. The test signal emitter emits a low power signal at a frequency substantially corresponding to a carrier frequency of a receiver unit 204. It is to be noted that such signals may have various applications, for instance, for testing multicouplers. In some applications such a signal is called a received signal strength indicator, RSSI.

The emitted signal is coupled to the transmitter antenna 203 via coupling means, for instance consisting of a cable 208 and a directional coupler 209. In an embodiment of the invention, this directional coupler may also be used to perform voltage standing wave ratio measurements on the transmitter antenna 203. The transmitter antenna transmits the test signal and the receiver antenna receives a certain fraction of the energy transmitted, all given that the system functions properly. Since the signal has a frequency within the frequency band of a receiver unit 204 it may be evaluated by means connected to the receiver unit. If multiple receiver antennas are used, the signal received by any particular antenna may be chosen as known in the art.

If the strength of the received signal is below a predetermined threshold value the system is likely to be faulty. Then an error report is delivered to the mobile radio network. The testing procedure may be initiated by the base transceiver station itself or by any other part of the mobile system. As an alternative the evaluation of the received signal may also take place in another part of the mobile system that is connected to the receiver unit. The evaluation of the signal may be software implemented.

The inventive concept also allows, optionally, separate testing of multicouplers at the receiving branch of the radio base station. This is performed by second coupling means 210, coupling the signal emitted by the test signal emitter 207 to the multicouplers 206 at the receiving branch. This enables the system isolate an error at the receiving branch to a certain part of the system. According to an embodiment of the invention it is advantageous to let the test signal correspond to a spare channel, not regularly used by the system. This allows the system to be tested without disturbing ongoing traffic. For FDMA (frequency division multiple access) systems the signal then has a frequency corresponding to a spare channel. For TDMA (time division multiple access) systems the signal then has a frequency and a timeslot timing corresponding to a spare channel.

Figure 3:
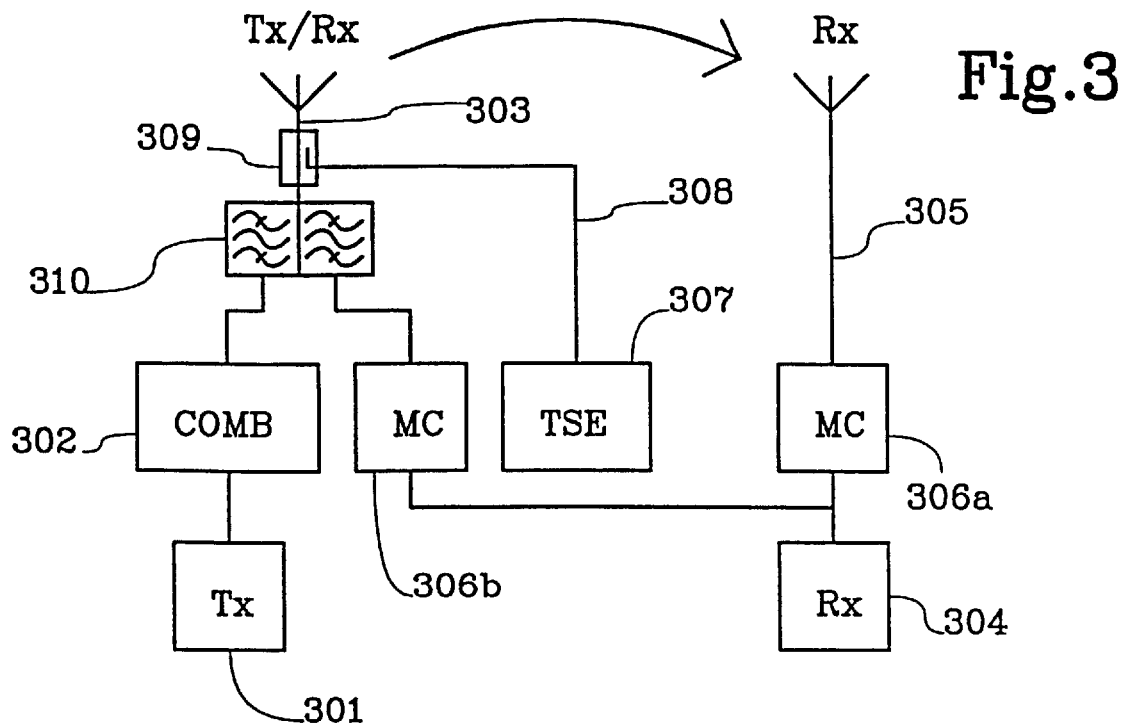
FIG. 3 illustrates an arrangement according to the invention, in a radio base station where the base station comprises one duplex antenna.

FIG. 3 illustrates an arrangement according to the invention, in a radio base station where the base station transceiver comprises one duplex antenna.

The base station involves transmitter units 301, receiver units 304, a combiner 302, multicouplers 306a, 306b, and a receiver antenna 305 as in the previously described embodiment. A duplex filter 310 is applied between the combiner 302 and a transmitter antenna 303. Therefore this antenna may also function as an auxiliary receiver antenna, thus constituting a duplex antenna. This arrangement allows antenna diversity to be achieved in a base station with only two antennas.

According to the invention a test signal emitter 307 emits a test signal that is coupled by coupling means 308, 309 to the duplex antenna 303. In this embodiment the test signal should be coupled to the duplex antenna 303 at a point between the duplex filter 310 and the antenna.

Figure 4:
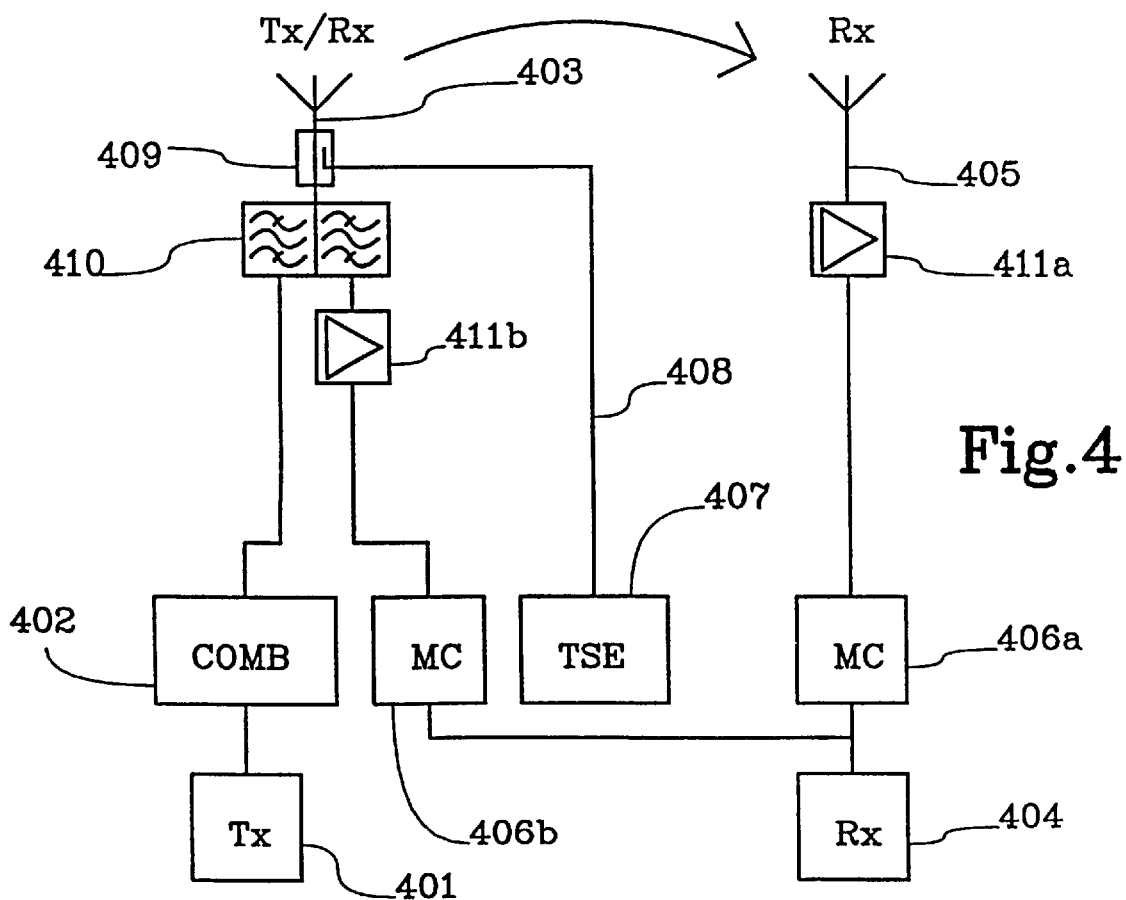
FIG. 4 illustrates an arrangement according to the invention, in a radio base station where the base station comprises one duplex antenna and tower mounted amplifiers.

FIG. 4 illustrates an arrangement according to the invention, in a radio base station where the base station transceiver comprises one duplex antenna and tower mounted amplifiers.

The base station involves transmitter units 401, receiver units 404, a combiner 402, multicouplers 406a, 406b, a duplex filter 410, a duplex antenna 403 and a receiver antenna 405 as previously mentioned. In this case tower mounted amplifiers 411a, 411b are applied at each receiver antenna branch. The tower-mounted amplifiers consist of low-noise amplifiers, placed in the vicinity of the respective antennas.

According to the invention a test signal emitter 407 emits a test signal that is coupled by coupling means 408, 409 to the duplex antenna 403. In this embodiment the test signal should be coupled to the duplex antenna 403 at a point between the duplex filter 410 and the antenna 403. It is to be noted that the invention is equally valuable in radio base stations where tower mounted amplifiers are used, but where the duplex antenna concept is not applied.

Figure 5:
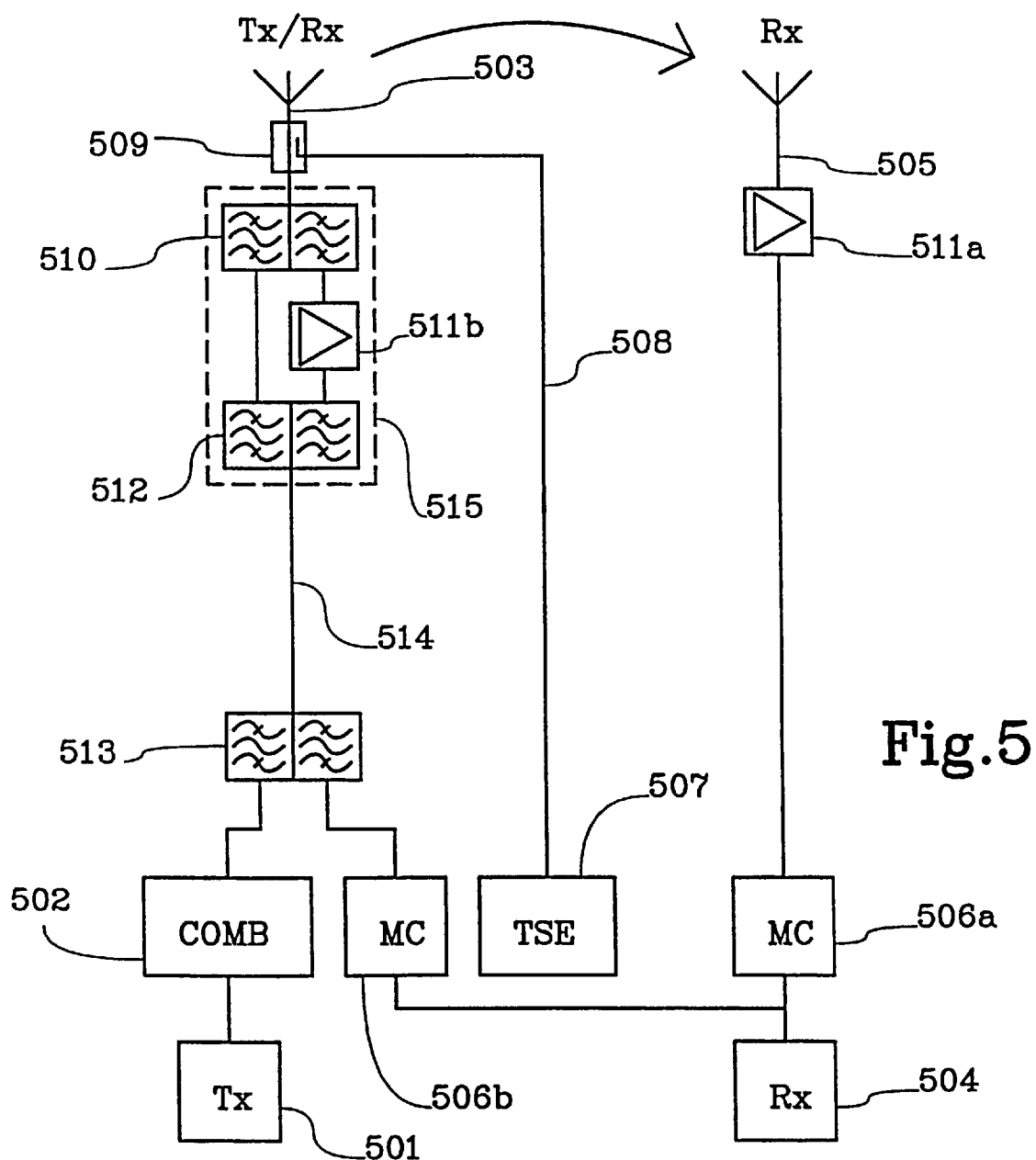
FIG. 5 illustrates an embodiment of a radio base station according to the invention where a duplex antenna is provided with a dual duplex tower mounted amplifier.

FIG. 5 illustrates an arrangement according to the invention, in a radio base station where the base station transceiver comprises one duplex antenna and tower mounted amplifiers. At the duplex antenna a dual duplex tower mounted amplifier is used.

The base station involves transmitter units 501, receiver units 504, a combiner 502, multicouplers 506a, 506b, a duplex antenna 503 and a receiver antenna 505 as previously described. In this case a tower-mounted amplifier 511a is applied at the receiver antenna branch. At the duplex antenna a dual duplex TMA 515 is applied. This TMA consists of a first duplex filter 510 coupled to the antenna 503, a second duplex filter coupled to the transmitters and the receivers. A low noise amplifier 511b is applied at the receiver branch between the first and the second duplex filter. Optionally, a power amplifier (not shown) may be provided at the transmitter branch between the first and second duplex filters in order to improve downlink range. The first and second duplex filters 510, 512 as well as the low noise amplifier 511b may be integrated as one dual duplex TMA unit 515. This unit allows a single cable 514 to be connected between the duplex antenna and the rest of the base station, which cable is used both for transmitting and receiving. However, a third duplex filter 513 must be applied at the lower end of the cable 514.

According to the invention a test signal emitter 507 emits a test signal that is coupled by coupling means 508, 509 to the transmitter antenna 503. In this embodiment the test signal should be coupled to the duplex antenna 503 at a point between the duplex filter 510 and the antenna 503.

It is to be noted that performing VSWR measurements on the duplex antenna 503 of the system described in FIG. 5 would be difficult. The reverse attenuation of a duplex filter may be large and in this case three such filters 513, 512, 510 are placed between the transmitter unit and 501 and the duplex antenna 503. An arrangement according to the invention, however, performs monitoring of the duplex antenna simultaneously with the monitoring of the receiver antenna 505. The arrangement according to the invention is not affected by the duplex filters.

The above-described embodiments serve only to exemplify how the invention may be carried out and do not limit the scope of protection sought. Other embodiments are possible within the scope of the attached claims.

What is claimed is:

1. Arrangement for monitoring a condition of at least one receiver antenna in a radio base station including at least one receiver unit connected to the at least one receiver antenna, the receiver unit receiving radio signals in a first frequency band, and at least one transmission unit connected to a second antenna, the transmitter unit transmitting radio signals in a second frequency band, the arrangement further comprising:

means for emitting a radio signal having a frequency value within the first frequency band, means for coupling the emitted radio signal to the second antenna for radio transmission to the first antenna, means connected to the at least one receiver unit for evaluating the radio signal received by the first antenna and thereby monitoring the condition of the first antenna, and a combiner connected to the transmission unit, wherein the coupling means is coupled to the second antenna at a point between the second antenna and the combiner.

2. An arrangement as claimed in claim 1 wherein the means for evaluating the received signal compares the received signal with a predetermined threshold value.

3. An arrangement as claimed in claim 1 wherein the radio signal is emitted within a spare channel, not normally used by the receiver.

4. An arrangement as claimed in claim 1 wherein the first and the second frequency bands are non-overlapping.

5. An arrangement as claimed in claim 1 wherein the second antenna is a duplex antenna and the arrangement further comprises a duplex filter wherein the coupling means is connected at a point between the duplex filter and the second antenna.

6. An arrangement as claimed in claim 1 further comprising an amplifier connected to the first antenna and located in the vicinity of the first antenna.

7. An arrangement as claimed in claim 1 wherein the second antenna is a duplex antenna and the arrangement further comprises a dual duplex tower mounted amplifier wherein the coupling means is connected at a point between the dual duplex tower mounted amplifier and the second antenna.

8. An arrangement as claimed in claim 1 wherein the means for coupling the signal to the receiver antenna includes a directional coupler that is also used for voltage standing wave ratio measurements on the transmitter antenna.

9. An arrangement as claimed in claim 1 further comprising means for connecting the signal from the means for emitting a radio signal having a frequency value within the first frequency band. directly to a multicoupler that is connected to at least one of the at least one receiver unit.

10. Method for monitoring a condition of at least one receiver antenna in a radio base station wherein the base station comprises at least one receiver unit and a first antenna and a multicoupler connecting the at least one receiver unit to the first antenna, wherein the receiver unit receives radio signals in a first frequency band, and the base station further comprises at least one transmission unit and a second antenna connected to the at least one transmission unit, the at least one transmission unit transmitting radio signals in a second frequency band and the method comprising the steps of:

emitting a radio signal having a frequency value within the first frequency band;

coupling the radio signal to the multicoupler for transmission to said the receiver unit;

evaluating the signal thus received by the receiver unit and thereby monitoring the state of the multicoupler;

coupling the radio signal to the second antenna for radio transmission to the first antenna; and evaluating the signal thus received by the first antenna and thereby monitoring the state of the first antenna.

11. Method for monitoring a condition of at least a first receiver antenna in a radio base station, wherein the base station comprises at least one receiver unit, the first receiver antenna, a multicoupler connecting the at least one receiver unit to the first receiver antenna, at least one transmission unit, a test signal emitter, a second antenna and a directional coupler that connects both the at least one transmission unit and the test signal emitter to the second antenna, wherein the receiver unit receives radio signals in a first frequency band, and the at least one transmission unit transmits radio signals in a second frequency band, and the method comprises the steps of:

generating in the test signal emitter a signal having a frequency value within the first frequency band;

providing the generated signal to the first receiver antenna from the test signal emitter via the directional coupler and radio transmission from the second antenna to the first receiver antenna; and evaluating the signal received by the first receiver antenna to monitor the state of the first antenna.

12. The method of claim 11, further comprising the steps of:

coupling the test signal emitter to the multicoupler and providing the generated signal from the test signal emitter to the receiver unit via the multicoupler; and evaluating the signal received by the receiver unit from the test signal emitter via the multicoupler to monitor the state of the multicoupler.

\* \* \* \* \*